United States Patent [19]
Kuryla

[11] 3,957,432
[45] May 18, 1976

[54] AQUEOUS PITUITOUS COLOR COMPOSITIONS BASED ON POLY(ETHYLENE OXIDE)

[75] Inventor: William Collier Kuryla, St. Albans, W. Va.

[73] Assignee: Union Carbide Corporation, New York, N.Y.

[22] Filed: Feb. 26, 1974

[21] Appl. No.: 445,886

[52] U.S. Cl. .............................. 8/93; 8/6.5; 8/7; 8/114; 8/178 R; 8/179
[51] Int. Cl.² ............... D06P 1/613; C09B 67/00
[58] Field of Search ............ 8/93; 260/37 AL, 37 P

[56] References Cited
UNITED STATES PATENTS
3,619,271  11/1971  Merz et al. ............................. 8/93
3,773,704  11/1973  Hall et al. ......................... 260/37 AL

OTHER PUBLICATIONS

Gaylord–Polyethers, Part I, Interscience, New York, 1963, pp. 119–122, 213–220, 239–245, 273–291.

*Primary Examiner*—H. S. Cockeram
*Attorney, Agent, or Firm*—Francis M. Fazio

[57] ABSTRACT

Color compositions useful for effecting designs on substrates comprise a color in a thickened aqueous mixture containing a high molecular weight poly(ethylene oxide) homopolymer. The poly(ethylene oxide) homopolymer preferably has a molecular weight of above about 400,000.

2 Claims, No Drawings

AQUEOUS PITUITOUS COLOR COMPOSITIONS BASED ON POLY(ETHYLENE OXIDE)

BACKGROUND OF THE INVENTION

In the production of many articles, novel styling and coloration effects are desired. Many methods have been used to achieve such effects, for example, design rolls, weaving, printing or other similar means. However, in many instances, the known procedures are not completely satisfactory and continued efforts are being made to achieve additional styling and coloration effects. In many cases, the color compositions have been achieved with natural and synthetic thickeners to facilitate handling. Nevertheless, problems have still persisted.

SUMMARY OF THE INVENTION

It has now been found that certain high molecular weight poly(ethylene oxide) homopolymers can be used in the preparation of color systems that permit the use of these color systems in the achievement of novel styling and coloration effects. The homopolymers are preferably those which have an average molecular weight above about 400,000; however, in certain instances homopolymers having low molecular weights, as low as about 100,000, can also be used where bleeding is not considered a disadvantage. The color compositions of this invention are highly pituitous in nature and are applied by dripping or stringing on to the surface of the substrate on the surface. The pattern formed is then fixed to the substrate by known conventional procedures.

DESCRIPTION OF THE INVENTION

The coloring compositions of this invention contain the color component, the high molecular weight poly(ethylene oxide) homopolymer, water, conventional additives such as fungicides, slimicides, antistatic agents, antioxidants, color fixatives, conventional thickeners and other known materials that are used in the art in the production of coloring baths or pastes. These conventional materials can be present in those concentrations known to be useful to those skilled in the art. The present invention is concerned with the discovery that certain poly(ethylene oxide) homopolymers enable one to produce a color composition which can be readily applied to a substrate in the manner hereinbefore described to achieve a pleasing pattern.

The poly(ethylene oxide) homopolymer suitable for use in this invention is represented by the formula

While the value of n can vary from about 2,250 to greater than 250,000, it is preferably from about 9000 to about 225,000. These represent average molecular weights of from about 100,000 to about 11,000,000, preferably from about 400,000 to about 10,000,000, respectively.

The homopolymer is present in the color composition at a concentration from 0.2 to about 25 weight per cent of the composition, preferably from about 0.5 to about 10 weight per cent, with the amount used thereof varying inversely with its molecular weight. Since those polymers having a higher molecular weight have a higher thickening capacity, lesser amounts thereof can be used. Conversely, larger amounts of the lower molecular weight homopolymers are required to obtain the desired thickness or pituitousness of the color composition. As previously indicated, conventional thickeners can also be present, such as, guar, hydroxyethyl cellulose, dextrins, starches, locust bean derivatives, etc., to modify the compositions. Illustrative of preferred poly(ethylene oxide) homopolymers are those having average molecular weights of 400,000, 600,000, 900,000, 4,000,000, 5,000,000, 6,000,000, or higher, all of which are commercially available materials. As previously indicated, those having lower average molecular weights e.g., 100,000, 200,000, or 300,000, can be used if dye bleeding is not considered a disadvantage.

The dyes which can be used in producing the color compositions are any of the conventional pigments or dyestuffs and include the phthalocyanine pigments, azoic pigments and dyes, direct dyes, acid dyes, basic dyes, sulfur dyes, vat dyes and the like. They can be present at a concentration of from about 0.05 to about 50 weight per cent of the composition. The dyes are well known to those skilled in the art and illustrative thereof one can mention Acid Yellow 1 (C.I. 10316), Acid Yellow 7 (C.I. 56205), Acid Yellow 23 (C.I. 19140), Acid Yellow 54 (C.I. 19010), Acid Yellow 99 (C.I. 13900), Acid Orange 6 (C.I. 14270), Acid Orange 24 (C.I. 20170), Acid Orange 74 (C.I. 18745), Acid Red 12 (C.I. 14835), Acid Red 26 (C.I. 16150), Acid Red 87 (C.I. 45380), Acid Red 186 (C.I. 18810), Acid Violet 7 (C.I. 18055), Acid Blue 22 (C.I. 42755), Acid Blue 158 (C.I. 14880), Acid Green 9 (C.I. 42100), Acid Green 25 (C.I. 61570), Acid Black 1 (C.I. 20470), Acid Black 52 (C.I. 15711), Mordant Yellow 1 (C.I. 14025), Mordant Orange 6 (C.I. 26520), Mordant Red 9 (C.I. 16105), Mordant Blue 3 (C.I. 43820), Mordant Green 9 (C.I. 19515), Mordant Brown 40 (C.I. 17590), Mordant Black 17 (C.I. 15705), Basic Yellow 2 (C.I. 41000), Basic Orange 10 (C.I. 46035), Basic Violet 1 (C.I. 42535), Basic Green 4 (C.I. 42000), Disperse Yellow 3 (C.I. 11855), Disperse Red 1 (C.I. 11110), Disperse Blue 3 (C.I. 61505), Disperse Black 7 (C.I. 11035), Natural Black 1 (C.I. 75290), Direct Yellow 50 (C.I. 29025), Direct Orange 26 (C.I. 29150), Direct Red 1 (C.I. 22310), Direct Red 24 (C.I. 29185), Direct Red 123 (C.I. 17820), Direct Violet 9 (C.I. 27885), Direct Blue 1 (C.I. 24410), Direct Blue 78 (C.I. 34200), Direct Blue 98 (C.I. 23155), Direct Green 6 (C.I. 30295), Direct Brown 2 (C.I. 22311), Direct Brown 31 (C.I. 35660), Direct Black 38 (C.I. 30235), Sulfur Yellow 2 (C.I. 53120), Sulfur Red 6 (C.I. 53720), Sulfur Blue 7 (C.I. 53440), Sulfur Green 2 (C.I. 53571), Sulfur Brown 10 (C.I. 53055), Sulfur Black 1 (C.I. 53185), Vat Yellow 2 (C.I. 67301), Vat Yellow 5 (C.I. 56006), Vat Orange 5 (C.I. 73335), Vat Red 10 (C.I. 67000), Vat Violet 1 (C.I. 60011), Vat Blue 6 (C.I. 69826), Vat Brown 3 (C.I. 69016), Vat Black 25 (C.I. 69525), Pigment Yellow 12 (C.I. 21090), Pigment Red 49 (C.I. 15630), Pigment Green 7 (C.I. 74260).

In a typical color composition there is present the solvent, which can be water or an organic solvent or mixture thereof, the poly(ethylene oxide) homopolymer at a concentration of from 0.2 to 10 weight per cent of the composition, the color component at a concentration of from 0.1 to 5 weight per cent and any of the other conventional additives in the usual and accepted concentrations known to those skilled in the art. These color compositions are prepared by conventional mixing procedures and one can, if desired, heat to facilitate the process of mixing.

The color compositions have a Brookfield viscosity of from 100 cps to 10,000 cps, preferably from 200 cps to 5,000 cps. The composition should be of such viscosity and pituity that it exits in a string like manner from the vessel used to apply it to the substrate.

The solution viscosity is determined as described on pages 22 and 23 of publication F-44029A, September 1973, entitled POLYOX published by Union Carbide Corporation. In this procedure, polymer passing through a 20 mesh screen is added to 125 ml. of anhydrous isopropanol. A one percent solution (6 grams) is used for those polymers having a molecular weight of about 4 million or higher and a five percent solution (30 grams) is used for all other polymers. The mixture is stirred with a high speed stirrer and the required amount of distilled water is added to the resin alcohol slurry all at once and then stirred rapidly for 1 minute. At this time, the stirring speed is reduced and stirring continued until there is a complete absence of gel particles. The solution is placed in a 25°C. bath for 30 minutes and the viscosity is then determined using an RVF Brookfield model for those polymers having a molecular weight in excess of 250,000 and an RVT Brookfield model for those polymers having an average molecular weight below 250,000. The spindle number, speed of rotation and factors used in calculating the viscosity are set forth on page 23 of said publication.

The solution pituity is determined as described in publication F-44029, November 1972, entitled POLYOX published by Union Carbide. This property is measured on the same solution prepared for the Brookfield viscosity determination. A 0.2 ml. micrometer syringe equipped with a 20 gauge needle is used. About 0.1 ml. sample of the solution is drawn into the syringe and the syringe is positioned in a vertical position about 2 cm. above a container. A 0.015 ml. portion of the sample is forced out of the syringe to form a drop at the tip of the needle. Timing is begun when the drop suddenly accelerates from the tip of the needle and is stopped when the thread or string breaks. The average of 5 such readings in seconds is reported as the solution pituity value.

The Brookfield viscosity and solution pituity test described are used for both the poly(ethylene oxide) homopolymer solution and the color compositions.

The color compositions are applied by permitting them to exit from a suitable orifice of desired size and shape and dripping on to the substrate to be decorated. The color composition exits in a string or ribbon effect and can be controlled to form a blob or drop like effect. One can use any number of different orifices and any number of different colored compositions in producing the design on the substrate. After the color composition has been applied to the substrate, it is fixed thereto by conventional fixing means known to those skilled in the art.

Any substrate can be used including paper, textile, wood, film, or the like. The color compositions of this invention are particularly suitable for decorating textiles and carpets, whether of synthetic, natural or mixed fibers. They are of special interest in the TAK dyeing of carpets, where it is found that novel patterns of swirls, circles, arcs, lines and the like can be produced.

The following examples serve to describe the invention. The Brookfield viscosities were determined using a No. 4 spindle at 60 rpm.

EXAMPLE 1

A suspension of 3 grams of poly(ethylene oxide) homopolymer having an average molecular weight of about four million was prepared in 100 grams of isopropanol. To this there was added 20 grams of a five percent solution of Acid Blue 25 (C.I. 62055) and the mixture was vigorously stirred. Then 80 grams of water was added and stirred until homogenous. The mixture was highly viscous and pituitous. A string of the above color solution was pulled out of the container and dropped on to the moving surface of a nylon carpet to form lines, arcs and swirls as a design. The patterned sample was permitted to stand overnight at room temperature to set and the carpet was dyed in the pattern in which the string had been placed on to the surface.

EXAMPLE 2

To a 64 gram portion of the color composition of Example 1 there were added 128 grams of water and there was obtained a somewhat less viscous solution containing about 0.49 weight percent of the poly(ethylene oxide) homopolymer. This viscous, pituitous solution was used to produce a design on 2 samples of nylon carpet, as described in Example 1. The carpet samples were steamed in a horizontal position for about 8 minutes, washed and oven dried for 30 minutes at 75°C. There was little or no color bleeding observed on the patterned surface carpet.

EXAMPLE 3

Following the procedure of Example 1, a color composition was produced with the exception that only 40 grams of water were added to the composition. This mixture, containing 1.84 percent of the poly(ethylene oxide) homopolymer, was kept overnight at 25°C.; it then had a Brookfield viscosity of 1300 cps. and a pituity solution value of 17.9 seconds.

The color composition was used to develop a design on a nylon carpet following the procedure described in Example 1 by permitting a string to fall on to the moving surface of a nylon carpet. The patterned carpet was steamed for 5 minutes, washed, and dried, no color bleeding was observed.

The same color composition was used to form a pattern by the same procedure on a non-woven fabric consisting of about 50 per cent cellulose fibers and 50 per cent nylon fibers.

EXAMPLE 4

In a manner similar to that described in Example 3, 2 grams of poly(ethylene oxide) homopolymer having an average molecular weight of above 6 million, 100 grams of isopropanol, 20 grams of a 5 percent Acid Blue 25 dyestuff solution and 120 grams of water were mixed to produce a thick viscous, pituitous mass. This color composition had a Brookfield viscosity of 1200 cps. and a solution pituity value of 72.2. A string of the color composition was pulled out of the beaker and dropped on to the surface of a moving nylon carpet to form a pattern. The patterned carpet was steamed in a horizontal position for about 5 minutes, washed and dried at about 75°C. for about 30 minutes. A slight trace of color bleeding was noted but it was not objectionable and added to the patterned effect.

EXAMPLE 5

In a manner similar to that described in Example 3, 8 grams of poly(ethylene oxide) homopolymer having an average molecular weight of about 400,000, 100 grams of isopropanol, 20 grams of a 5 percent Acid Blue dyestuff solution and 80 grams of water were mixed to produce a viscous, pituitous color composition having a Brookfield viscosity of 1860 cps. and a solution pituity value of 1.8 seconds. A falling string of this solution was used to form a pattern on a nylon carpet. The carpet was steamed, washed and dried as described in Example 3 to produce a patterned design that showed essentially no color bleeding.

The same procedure was used to produce a design on a nylon fabric. This fabric was steamed, washed and dried with essentially no color bleeding noted.

EXAMPLE 6

In a manner similar to that described in Example 3, 5 grams of poly(ethylene oxide) homopolymer having an average molecular weight of about 900,000, 100 grams of isopropanol, 20 grams of a 5 percent Acid Blue dyestuff solution and 80 grams of water were mixed to produce a color composition having a Brookfield viscosity of 740 cps. and a solution pituity value of 9.5 seconds. A string of this color composition was used to produce a pattern by moving the nylon carpet under the falling stream. The patterned carpet was steamed, washed and dried, as described in Example 4. It showed essentially no dye bleeding.

The same color composition was used by the same falling stream technique to form a design of circles, arcs, lines, and the like on a light weight nylon cloth. This was then fixed as described in Example 4 and a pleasing effect was obtained.

Example 7

In a manner similar to that disclosed in Example 3, 1.5 grams of poly(ethylene oxide) homopolymer having an average molecular weight of about four million, 1.5 grams of guar bean gum, 20 grams of a 5 percent Acid Blue dyestuff solution and 80 grams of water were mixed to produce a color composition having a Brookfield viscosity of 350 cps. and a solution pituity value of 18 seconds. A sample of nylon carpet was dyed in a pattern by the same procedure described in Example 3; essentially no bleeding was observed after steaming, washing and drying.

The same color composition was used to form a pattern on a light weight nylon cloth. After fixing as described in Example 4, essentially no bleeding was observed.

For comparative purposes a composition was prepared omitting the poly(ethylene oxide) homopolymer and using 3 grams of the guar bean gum, and 120 grams of water. This color composition had a Brookfield viscosity of 4500 cps. but was not pituitous. A dyeing attempt on the nylon carpet with this composition using the same procedure described above resulted in spots only. No stringing of the color composition was observed and the colored spots bled severely during the steaming, washing and drying.

The data presented in this example shows that a conventional thickener by itself will not produce a satisfactory color composition for use in a pattern dyeing procedure.

EXAMPLE 8

In a manner similar to that described in Example 3, 1.5 grams of poly(ethylene oxide) homopolymer having an average molecular weight of about four million, 1.5 grams of hydroxyethyl cellulose having an average molecular weight of about 100,000, 20 grams of a 5 percent Acid Blue 25 solution and 80 grams of water were mixed to produce a color composition having a Brookfield viscosity of 1080 cps. and a solution pituity value of 36.8. This color composition was used to form a pattern on a nylon carpet following the falling stream procedure described in Example 3. After steaming, washing and drying no dye bleeding was observed.

The same composition was used to produce a pattern on a light weight nylon cloth by the same technique. After fixing as described in Example 4, no dye bleeding was observed.

Following the procedure described above, a similar color composition was prepared but using 3 grams of the hydroxyethyl cellulose only and 120 grams of water. It was necessary to add three drops of formic acid to the water to assist solution of the hydroxyethyl cellulose. After stirring for 5 minutes, 7 drops of 25 per cent caustic solution were added and the mixture kept overnight at 25°C. This color composition had a Brookfield viscosity of 6600 cps. No stringing could be obtained when it was used in a dyeing attempt on nylon carpet; a further indication of the unexpected and unobvious results attainable with the compositions of this invention.

EXAMPLE 9

In a manner similar to that described in Example 1, 3 grams of poly(ethylene oxide) homopolymer having an average molecular weight of about four million were dispersed in 100 grams of isopropanol followed by the addition of 20 grams of a 5 weight percent dispersion of Dispersed Blue 7 (C.I. 62500). Then 120 grams of water were added and the solution mixed and kept overnight at 25°C. This pituitous color composition had a Brookfield viscosity of 1590 cps. Following the procedure described in Example 1, a jute backed polyester shag carpet was dyed by a falling stream of the color composition. The dyed carpet was heat set in an oven at 150°C. for 10 minutes, followed by steaming, washing, and drying. A very attractive styling effect was achieved, whereby a medium blue color shade was produced on the outer tips of the yarn tufts where the dyestuff touched the fiber with the balance of the shag tufts remaining undyed. Essentially no dye migration or bleeding was observed.

EXAMPLE 10

In a manner similar to that described in Example 1, 3 grams of a poly(ethylene oxide) homopolymer having an average molecular weight of about four million were dispersed in 100 grams of isopropanol, followed by 20 grams of a 5 percent solution of Basic Red 13 (C.I. 48015), 120 grams of water were then added and the pituitous color composition was kept overnight at 25°C. It had a Brookfield viscosity of 1350 cps. This color composition was used to produce a pattern of lines, arcs and circles, by the procedure described in Example 1, on an undyed white tufted modacrylic carpet having a polypropylene backing and on a light brown colored modacrylic carpet. Each carpet sample was steamed for 5 minutes and then dried. In both instances essentially no dye bleeding was observed and an attractive design was obtained.

EXAMPLE 11

In a manner similar to that described in Example 1, 3 grams of poly(ethylene oxide) homopolymer having an average molecular weight of about four million was dispersed in 100 grams of isopropanol followed by 20 grams of a 5 weight percent solution of Direct Blue 80 (Superlite Fast Blue RL). Then 120 grams of water were added, the pituitous mixture stirred and kept overnight at 25°C. The Brookfield viscosity of this color composition was 1350 cps.

A rayon shag pile tufted carpet with a cotton backing was dyed by a falling stream of this pituitous, viscous color composition to produce a pattern of lines, arcs, circles, spots, and the like, steamed for 5 minutes and dyed.

The same color composition was used to dye a sample of (a) cotton flannel fabric, (b) paper, (c) a rayon blanket fabric, (d) a pine plywood surface by the same technique. In each instance an attractive pattern was obtained.

EXAMPLE 12

A 50 gram portion of the color composition of Example 3 was diluted with 100 grams of water and the viscous, pituitous composition was used to produce a pattern on a carpet surface. This dilution produced a good stream for dyeing by the process of this invention. However, an attempt to further dilute this solution at a ratio of 3:1 with 2 parts of water added to each part thereof yielded a color composition that could not be used by the method of this application as it did not possess the viscosity and pituity properties required.

Following the same dilution procedures, the color composition of Example 4 was diluted and the exact same results were obtained.

EXAMPLE 13

Following the procedure described in Example 3, 1 gram of poly(ethylene oxide) homopolymer having an average molecular weight of about four million was dissolved in 200 grams of water and 0.4 grams of a 5 percent Acid Blue 25 solution was added. This color composition was highly viscous and pituitous. It produced an attractive pattern of lines, arcs, swirls, and the like, by the procedure described in Example 3, when applied to a carpet.

EXAMPLE 14

In a manner similar to that described in Example 3, 45 grams of a poly(ethylene oxide) homopolymer having an average molecular weight of about 100,000, 100 grams of isopropanol, 20 grams of a 5 percent Acid Blue 25 dye solution and 80 grams of water were mixed to produce a color composition having a Brookfield viscosity of 750 cps. and a solution pituity value of 1.4 seconds. A nylon carpet was dyed by a falling stream of a string of this solution and fixed and steamed, washed and dried as described in Example 3. A considerable amount of color bleeding was observed which is attributed to the low molecular weight of the poly(ethylene oxide) homopolymer used. The results in this example indicate that the higher molecular weight polymers are preferred to prevent excessive bleeding. However, the lower molecular weight materials are still suitable in that they produce a color composition which will form a string and can be used in the falling stream method.

What I claim is:

1. A color composition comprising an aqueous mixture of water containing from 0.05 to 50 weight percent of dyestuff, and from about 0.5 to about 10 weight percent of a poly(ethylene oxide) homopolymer having an average molecular weight of from about 400,000 to about 10,000,000; said weight percentages based on the weight of said composition; and said composition having a Brookfield viscosity of from 100 cps to 10,000 cps and a pituity such that it exits in a string like manner from the vessel used to apply it to the substrate.

2. A method for coloring a substrate which comprises applying to the substrate a color composition comprising an aqueous mixture of water containing from 0.05 to 50 weight percent of dyestuff, and from about 0.05 to about 10 weight percent of a poly(ethylene oxide) homopolymer having an average molecular weight of from about 400,000 to about 10,000,000, said weight percentages based on the weight of said composition; and said composition having a Brookfield viscosity of from 100 cps to 10,000 cps and a pituity such that it exits in a string like manner from the vessel used to apply it to the substrate.

* * * * *